US008302136B2

(12) United States Patent
Buehl et al.

(10) Patent No.: US 8,302,136 B2
(45) Date of Patent: *Oct. 30, 2012

(54) SYSTEMS AND METHODS FOR PACKAGING, DISTRIBUTING AND MANAGING ASSETS IN DIGITAL CABLE SYSTEMS

(75) Inventors: Joseph G. Buehl, Studio City, CA (US); Darryl Lanay DeFreese, Lawrenceville, GA (US)

(73) Assignees: Ericsson Television Inc., Duluth, GA (US); Time Warner Cable, Stamford, CT (US)

( * ) Notice: Subject to any disclaimer, the term of this patent is extended or adjusted under 35 U.S.C. 154(b) by 207 days.

This patent is subject to a terminal disclaimer.

(21) Appl. No.: 12/814,040

(22) Filed: Jun. 11, 2010

(65) Prior Publication Data

US 2010/0246667 A1    Sep. 30, 2010

Related U.S. Application Data

(63) Continuation of application No. 10/053,867, filed on Jan. 18, 2002, now Pat. No. 7,761,899.

(60) Provisional application No. 60/263,274, filed on Jan. 23, 2001.

(51) Int. Cl.
*H04N 7/173* (2011.01)
*H04N 7/16* (2011.01)
*G06F 15/177* (2006.01)

(52) U.S. Cl. ............... 725/86; 725/87; 725/98; 725/105; 725/114; 725/119; 725/143; 725/144; 709/220

(58) Field of Classification Search ............ 725/86
See application file for complete search history.

(56) References Cited

U.S. PATENT DOCUMENTS

| | | | |
|---|---|---|---|
| 5,585,838 A | 12/1996 | Lawler et al. |
| 5,661,516 A | 8/1997 | Carles |
| 6,029,195 A | 2/2000 | Herz |
| 6,138,119 A | 10/2000 | Hall et al. |
| 6,324,581 B1 | 11/2001 | Xu et al. |
| 6,463,454 B1 | 10/2002 | Lumelsky et al. |
| 6,564,263 B1 | 5/2003 | Bergman et al. |
| 6,668,377 B1 | 12/2003 | Dunn |
| 6,804,537 B1 | 10/2004 | Fujii |
| 6,804,708 B1 | 10/2004 | Jerding et al. |
| 6,983,478 B1 | 1/2006 | Grauch et al. |
| 7,028,071 B1 | 4/2006 | Slik |
| 7,036,138 B1 | 4/2006 | Tash |
| 7,039,933 B1 | 5/2006 | Chen et al. |
| 7,069,571 B1 | 6/2006 | Del Sesto et al. |
| 7,080,035 B1 | 7/2006 | Williams et al. |
| 7,434,242 B1 | 10/2008 | Goode |
| 7,529,806 B1 | 5/2009 | Shteyn |
| 2001/0014975 A1 | 8/2001 | Gordon et al. |
| 2002/0083441 A1 | 6/2002 | Flickinger et al. |

*Primary Examiner* — Justin Shepard

(57) ABSTRACT

Assets, such as content and related data are packaged, transmitted, received and managed in a digital cable television system to standardize the distribution of content and services from a content/service provider to subscribers in the system. The standardized format for packaging content enables the digital cable system to package, transmit, receive and manage diverse types of content, such as MPEGs, executable files, HTML pages, and the like, using standard system components without requiring reprogramming of the system to deploy new services. Service and content providers are freed from having to develop custom formats for delivering content and data to the cable system. Moreover, the standardized bundling of content and related data that is enabled by the invention allows the cable system operator to automate the deployment of services based on specific content and data to select subscribers.

10 Claims, 4 Drawing Sheets

SYSTEMS AND METHODS FOR PACKAGING, DISTRIBUTING AND MANAGING ASSETS IN DIGITAL CABLE SYSTEMS

RELATED APPLICATION DATA

The present application is a continuation of U.S. patent application Ser. No. 10/053,867, filed on Jan. 18, 2002 now U.S. Pat. No. 7,761,899, which in turn claims priority to U.S. Provisional Patent Application No. 60/263,274, entitled "Asset Distribution and Management in Digital Cable Headends," filed on Jan. 23, 2001, the entire contents of both of which are incorporated by reference herein.

FIELD OF THE INVENTION

This invention relates in general to the field of cable systems, and more particularly, to the distribution and management of services such as video, audio, images, and the like, in digital cable systems.

BACKGROUND OF THE INVENTION

Historically, television services have been comprised of analog broadcast audio and video signals. Cable television systems now receive broadcasts and retransmit them with other programming to users over land-line networks, typically comprising fiber optic cable and coaxial cable. With the recent advent of digital transmission technology, cable television systems are now capable of providing much more than the traditional analog broadcast video. For instance, two-way and advanced one-way communications between a subscriber and a cable system headend are now possible.

In implementing enhanced programming, the home communication terminal, otherwise known as the set-top box, has become an important computing device for accessing video services and navigating a subscriber through a maze of available services. In addition to supporting traditional analog broadcast video functionality, digital set-top boxes now also support an increasing number of services which are digital two-way communications, such as video-on-demand, email and web-browsing. These are all in addition to the host of other television services which are increasingly being demanded by consumers, examples of which include audio and audio/visual programming, advanced navigation controls, impulse pay-per-view technology, and on-line commerce.

With the addition of interactive services, increased bandwidth and the emergence of bi-directional communication capabilities available through a digital television system, there is a need to provide a standard method of distributing and providing a wide variety of services and content from multiple content and service providers. This allows content to be easily distributed which enables a greater variety of content to be made available to subscribers. Currently, content such as a movie is provided to cable operators by content providers via a tape or digital transfer. To broadcast the movie to one or more viewers the cable operators must manually input data associated with the movie, such as the movie title, actors and actresses, date filmed, and like data. Furthermore, to provide a service such as a Movie-On-Demand (MOD) service, the format for receiving content must be pre-established such that any content retrieved electronically can be understood by the system. Where services are added, each service requires that the cable operators create an application specifically for the service, which is time-consuming and results in edits to system software that was created without the service in mind.

Therefore, what is needed are systems and methods for standardizing the electronic and digital transmission, reception, distribution and management of content and services in a cable system.

SUMMARY OF THE INVENTION

The present invention provides for the bundling of content and related data in a standardized format called an asset so that each service and/or content provider is not required to create a method by which the content and data are transferred to the cable system. Additionally, the bundling of content and related data allows the cable system to automate the installation and forwarding of content and data to select subscribers. Furthermore, the present invention utilizes an Asset Management System (AMS) that manages the asset and its contents. The AMS, however, is separate from headend applications that receive and understand the asset received at the headend. The applications instruct the AMS where content should be stored among headend servers. Because the AMS is independent from the applications, updates to the applications may be made, and additional applications may be installed in the headend without updating the AMS. This is extremely beneficial in cable television systems, which are constantly evolving in the type and quantity of services being offered, because new services will, in a worst case scenario, only require an additional application installed in the headend rather than substantial changes to existing elements such as the AMS.

According to one embodiment of the present invention, there is disclosed an asset that packages related content and data for distribution and service implementation in a digital cable system. The asset includes at least one metadata object, where the at least one metadata object identifies an application that is associated with the asset, and at least one content object, where the at least one content object represents data to be stored based upon instructions of the application associated with the asset.

According to one aspect of the invention, the asset further includes an embedded asset, such that the asset is recursive. Additionally, the embedded asset can further include at least one embedded content object, and the can also include at least one embedded metadata object. According to another aspect of the invention, the at least one content object represents data selected from the group consisting of an MPEG file, an executable file, an HTML page, and a JPEG image. According to yet another aspect of the invention, the at least one metadata object identifies the at least one content object.

The asset can further include a machine readable description, such as a table, that identifies the at least one metadata object and the at least one content object. According to one aspect of the invention the machine readable description comprises XML or an XML file.

According to another embodiment of the present invention, there is disclosed a digital cable system that receives and delivers related content and data to facilitate service implementation in a digital cable system. The digital cable system includes a staging server that receives an asset from a content provider, where the asset comprises content and data related to the content, a content server in communication with a subscriber set-top box for providing the content to the set-top box, and an application associated with the asset to interpret the data related to the content, where the application identifies the server that receives at least a portion of the content from the staging server.

According to one aspect of the invention, the system also includes an asset management system that parses the asset to determine that the asset identifies the application. The asset management system can also maintain a database associating the content and the data related to the content. According to another aspect of the invention, the asset management system resides between the application and the staging server such that the staging server and application are in indirect communication. Furthermore, the asset management system is operable to instruct the content server to request at least a portion of the content from the staging server.

According to yet another aspect of the invention, the application is operable to identify the content server based upon the data related to the content. The content server can also receive at least a portion of the content from the staging server, and can request at least a portion of the content from the staging server using File Transfer Protocol (FTP). Moreover, the application can include a provisioning user interface to allow a user to identify the at least one server to receive at least a portion of the content, where the provisioning user interface allows a user to specify rules for distributing at least a portion of the content to the content server.

According to yet another embodiment of the invention, there is disclosed a method performed at a cable system headend for distributing related content and data to facilitate service implementation in a digital cable system. The method includes receiving an asset, where the asset includes a machine readable description identifying content and related data, storing the asset in a staging server, and parsing the machine readable description to determine an application associated with the asset and identified by the related data. The method further includes examining the related data at the application to identify the content server that should receive at least a portion of the content, and instructing the content server to retrieve the content from the staging server.

According to one aspect of the present invention, the method also includes the step of receiving the content from the staging server, which can include receiving the content directly from the staging server. According to another aspect of the invention, the method further includes the step of retrieving the machine readable description from the staging server prior to the step of parsing the machine readable description. According to yet another aspect of the present invention, the step of examining the related data at the application further includes the step of identifying the at least one server that should receive at least a portion of the content based upon rules defined by a user associated with the application.

Many objects, features and advantages of the present invention will become apparent to one of ordinary skill in the art upon examination of the following drawings and detailed description.

BRIEF DESCRIPTION OF THE DRAWINGS

Figure 1:
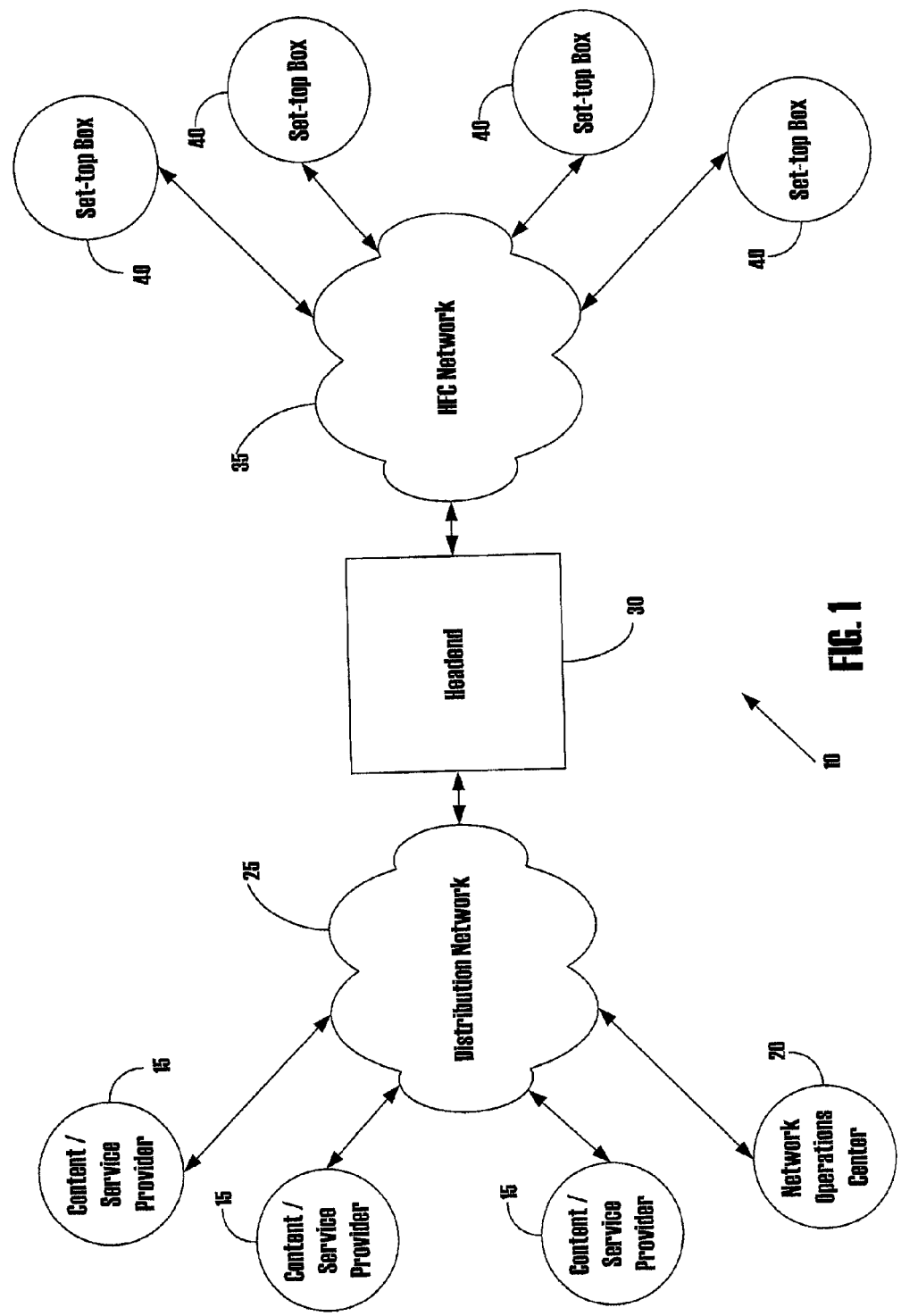

Having thus described the invention in general terms, reference will now be made to the accompanying drawings, which are not necessarily drawn to scale, and wherein:

FIG. 1 is a high-level block diagram view of a Digital Broadband Delivery System in accordance with an embodiment of the present invention.

Figure 2B:
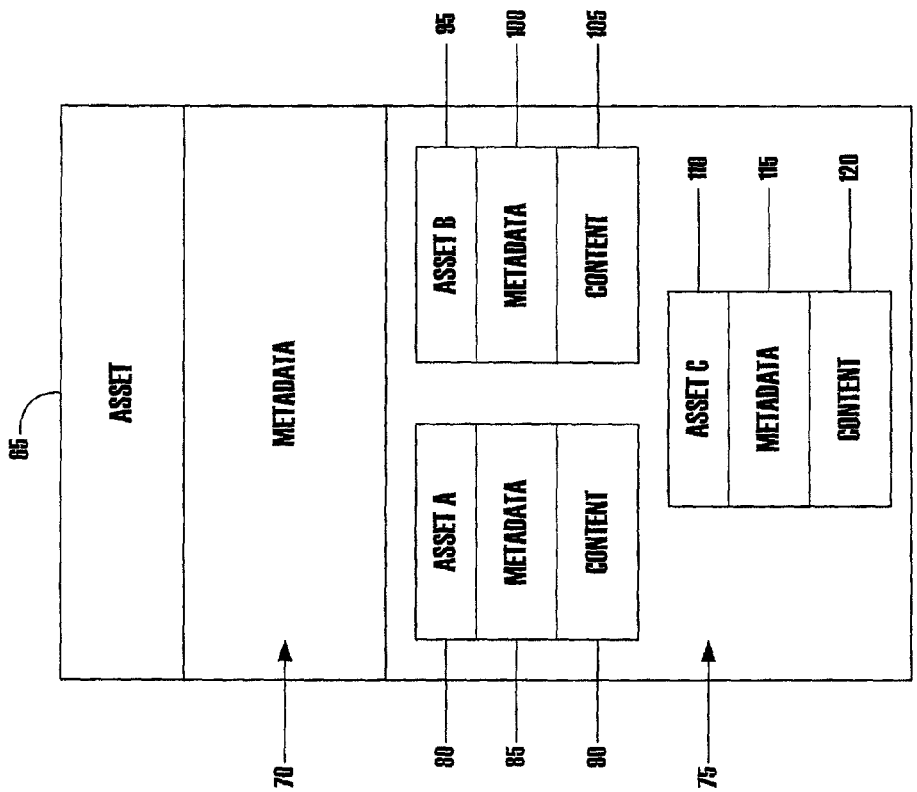
Figure 2A:
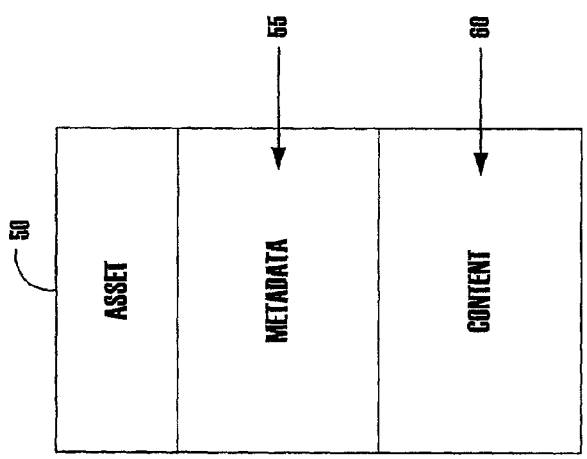

FIG. 2A shows a block diagram view of an asset, according to one aspect of the present invention.

FIG. 2B shows a block diagram view of an asset having embedded assets, according to one aspect of the present invention.

Figure 3:
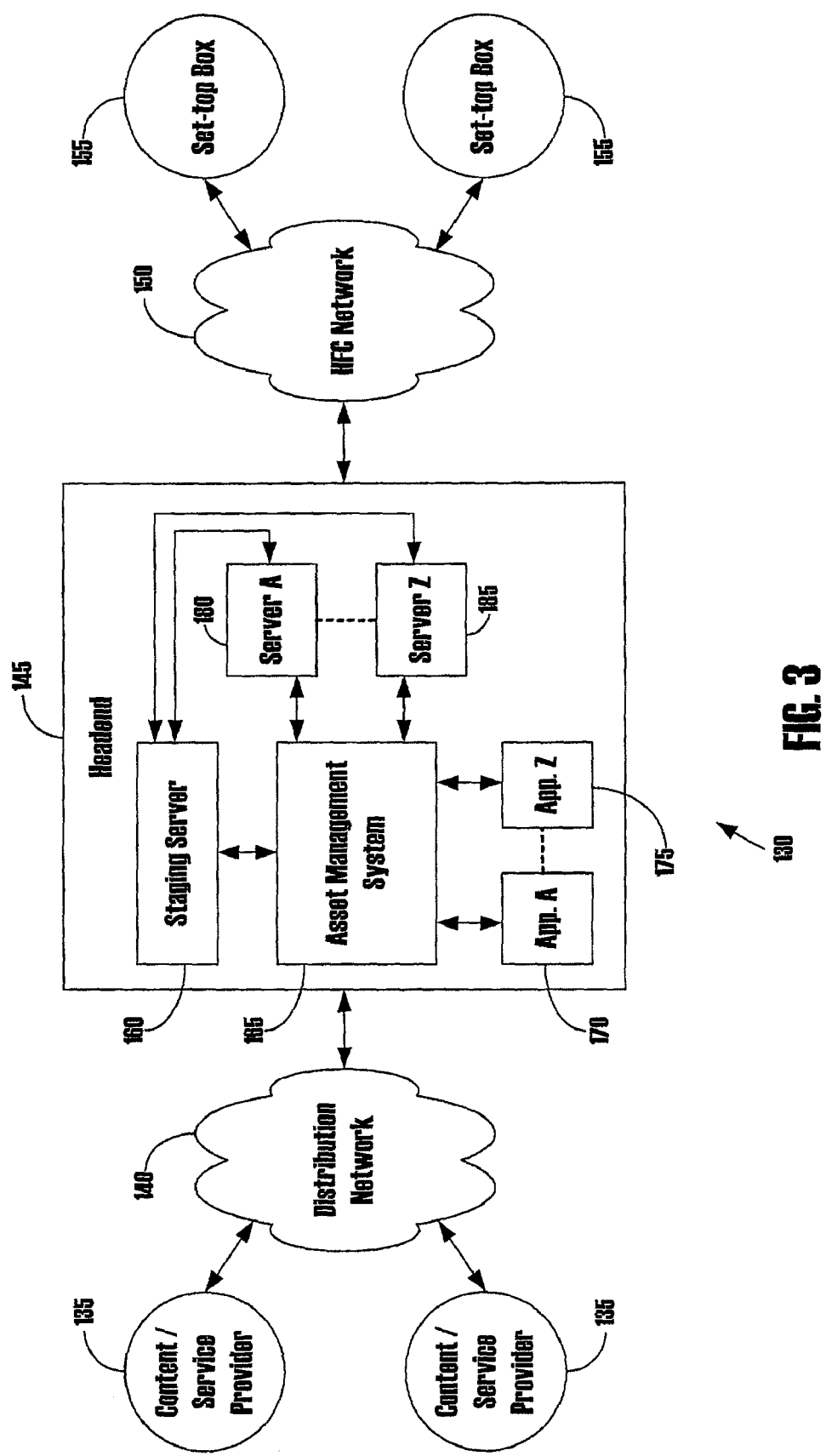

FIG. 3 shows a block diagram view of a DDDS and the components within the headend, according to one embodiment of the present invention.

Figure 4:
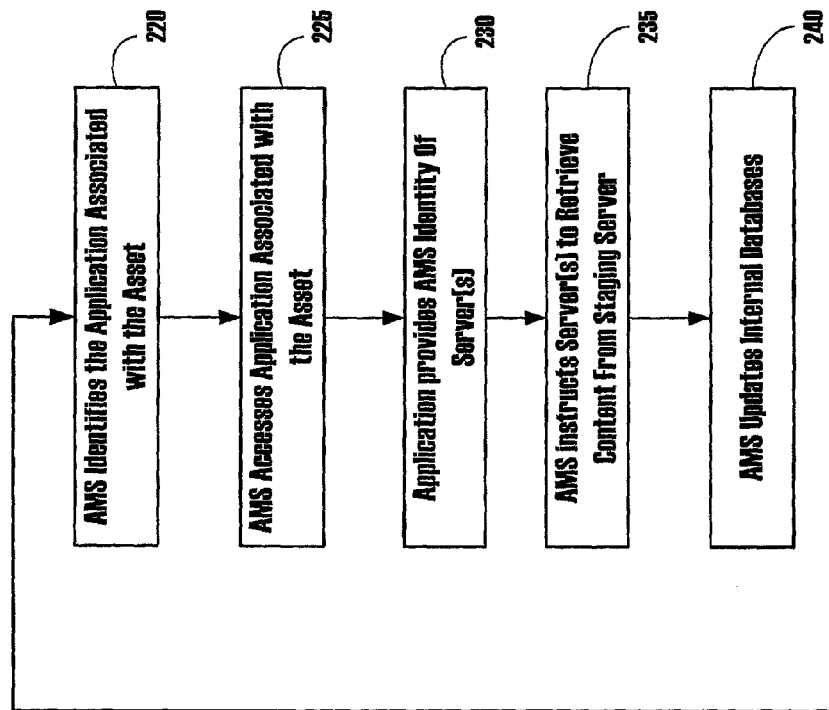
Figure 4:
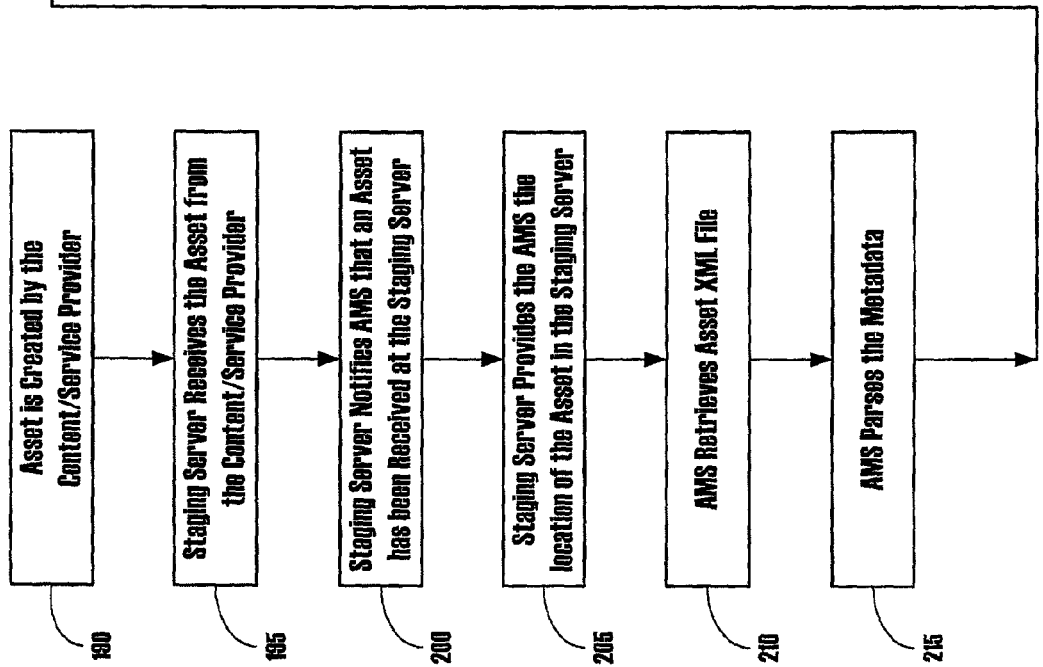

FIG. 4 is a block diagram flow chart showing an illustrative example of the creation and distribution of an asset in the DDDS of FIG. 3, according to one aspect of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 shows a block diagram view of a Digital Distribution and Delivery System (DDDS) 10, which may comprise a digital broadband cable system, as are well known in the art. Generally, the DDDS 10 is an integrated network system that features video, audio, voice and data services transmitted to Cable television (TV) subscribers. Although FIG. 1 depicts a high level view of a DDDS 10 including a single HFC Network 35, as will be described below, it should be appreciated that a plurality of DDDSs including multiple HFC Networks can tie together a plurality of regional networks into an integrated global network so that Cable TV subscribers can receive content provided from anywhere in the world. The DDDS 10 delivers broadcast video signals as digitally formatted signals in addition to delivering traditional broadcast analog video signals. Furthermore, the DDDS 10 can support one-way broadcast services as well as both one-way data services and two-way media and data services. The two-way operation of the network allows for user interactivity with services, such as Pay-Per-View programming, Near Video-On-Demand (NVOD) programming (according to any of several known NVOD implementation methods), Video-on-Demand (VOD) programming (according to any of several known VOD implementation methods), and interactive applications, such as Internet connections and interactive services that render real-time bi-directional communication on a personalized basis such as bi-directional audio-visual communication.

The DDDS 10 also provides the interfaces, network control, transport control, session control, and servers to establish on-demand session-based bi-directional communication service between a particular remote destination and a set-top box user for delivering media from the particular remote destination to the set-top box user and input information from the set-top box user to the particular remote destination. A remote destination during a session of a bi-directional communication service may comprise a remote personal destination such as a remote vendor that offers a bi-directional communication service for a purchasable period of time in which a viewer communicates real-time with the vendor on a personal basis. In either case, dedicated DDDS resources are allocated to fulfill individualized bi-directional communication over a purchasable period.

Referring again to FIG. 1, the DDDS 10 is composed of content/service providers 15, at least one network operations center (NOC) 20, a distribution network 25, a headend 30, a hybrid fiber-cable (HFC) Network 35 and subscribers' set-top boxes 40. It should be appreciated that although FIG. 1 includes a number of single components (i.e., NOC, headend, HFC network), the DDDS 10 can feature a plurality of each of the illustrated components. The content/service providers 15 represents one or more providers of content, such as video channels, music channels, data channels, video services, audio services and data services. For example, according to one aspect of the invention, a content/service provider 15 could comprise a distributor of movies. According to another aspect of the invention, the content/service providers 15 could represent an Internet Service Provider (ISP) providing data to the system to enable subscribers web access or web-enhanced video via the subscriber's television set. The content/service provider 15 transmits the content to a headend 30 via a high speed distribution network 25 for further transmission to subscribers downstream in the network. Also in communication with the headend 30 is the NOC 20, which is an external management center interfaced with the DDDS 10 to allow for the remote operation of the system. Typically, the high speed distribution network 25 includes one or more satellite and/or fiber optic components and links for high-speed data transmission of content and/or services to the headend 30. It should be appreciated that the high speed distribution network 25 represents hardware and software components for electrically transmitting content and/or services to the headend 30, as opposed to physically carrying or transporting content, such as a video tape or digital video disc, from the content/service provider 15 to the headend 30.

From the headend 30 content and/or services are communicated by the HFC Network 35 to the subscriber set-top boxes 40. The HFC Network 35 typically comprises a plurality of HFC nodes, each which may service a local geographical area. More specifically, content and/or services are provided from the content/service provider 15 via transmission through the headend 30 and HFC Network 35 downstream to one or more taps that connect to a subscriber's set-top box 40 through coaxial cable in a logical tree configuration, which is where the optical-to-electrical and electrical-to-optical conversations of the HFC network 35 take place. It will be appreciated by those of skill in the art that the system 10 may include a number of additional elements, such as Hubs, HFC nodes, taps, network interface units, RF amplifiers, and the like. However, because the general features of a DDDS is well known to those of skill in the art, further description is not contained herein.

In conventional DDDS systems the content/service provider 15 distributes content physically or electronically to the headend 30 for installation. Typically, the manner in which content and/or services are distributed is highly dependent upon the nature of the content and/or services being transferred to the headend 30, the capabilities of the content/service provider 15, and the content/service provider's 15 relationship with the headend 30. For instance, where a particular content/service provider 15 is in the business of providing movies-on-demand (MOD) to subscribers, the MOD provider may transmit the movie electronically in an MPEG format to the headend 30 over the high speed distribution network 25. Data associated with the movie, such as the title, actors and actresses, director, year filmed, and the like, are typically forwarded to the headend 30 by conventional means, such as via fax or mail, so that a user at the headend 30 can input the data so that it can be viewed by a subscriber who wishes to find out additional information associated with the movie. Although such content may also be provided electronically, the headend 30 must be setup in advance to understand the format and nature of the information it receives. However, because DDDSs such as the one illustrated in FIG. 1 allow for a wide variety of content to be transmitted to set-top boxes, in conventional systems this requires that the content/service provider 15 and headend 30 pre-establish the method and format for a particular service such that the headend 30 can interpret the data received and provide the content to subscribers. It will readily be appreciated that this lack of a generalized method and path by which to transmit content impedes the services growth of cable systems, particularly, the provisioning of new content and services. The present invention provides a standardized format for distributing content and services such that each service that is implemented does not have to pre-establish and invent the manner in which the content is forwarded to the headend 30. The standard format for distributing content is illustrated in FIGS. 2A and 2B.

FIG. 2A shows an asset 50, which comprises metadata 55 and content 60. The asset 50 is a structure usable by any content/service provider for distributing content and services to the headend 30. According to one aspect of the invention, the metadata 55 is stored in an XML file, which also contains information as to the content associated with the asset. The content 60 is stored in a separate content file. As will be described in detail below with respect to FIGS. 3 and 4, the headend 30 is capable of receiving the asset 50, parsing it to determine its contents, and distributing its components to the appropriate subscriber set-top boxes 40. Generally, an asset represents physical media files that may be transmitted and stored in the DDDS. Assets provide the means to manage the content required to implement a service, including video, audio, images, executables, scripts, configuration files, text, fonts, HTML pages, and the like. The content 60 is the physical data, such as a movie, poster, image, or the like, while the metadata 55 is the data that describes the attributes of the content. For instance, where the content 60 represents a movie, the metadata may include the movie title, its rating, title, director, runtime, year made, and like data. In addition, the metadata includes data identifying the type of asset it is associated with and specific characteristics of the asset, such as the asset's structure. These identification and characteristic features allow the headend 30 to determine what to do with the asset 50 once it arrives at the headend 30.

According to one aspect of the invention an asset can also contain other assets hierarchically arranged to have a parent-child relationship. FIG. 2B shows a block diagram view of an asset 65 having embedded assets 80, 95, 110, according to one aspect of the present invention. Similar to the asset 50 of FIG. 2A, the asset 65 illustrated in FIG. 2B includes metadata 70 and content 75. However, in the asset 65 of FIG. 2B, the content 75 includes three additional assets: Asset A 80, Asset B 95, and Asset C 110. Each of these assets, in turn, include metadata 85, 100, 115 and content 90, 105, 120, respectively. Because an asset may be created that includes embedded assets, a content provider can group material together in a logical tree structure. For instance, according to one illustrative and non-limiting example, an MOD asset may contain title, trailer and poster assets. Each of these embedded assets, in turn, include metadata and content. For example, the trailer embedded asset will include the trailer content (i.e., the MPEG trailer file) and metadata identifying the trailer's rating and that the content is an MPEG file.

As will be described with respect to FIGS. 3 and 4, one benefit of this structure is the headend's 30 ability to parse the asset and distribute its contents among various servers. Additionally, this structure allows for any type of content to be transmitted, received and immediately understood in the system of the present invention because the metadata allows the headend 30 to identify an appropriate application stored in the headend 30 that understands the structure of the asset, which can distribute it to servers for transmission to subscriber set-top boxes 40.

FIG. 3 shows a detailed view of the headend 145 components within a DDDS 130 of the present invention, according to one embodiment of the present invention. It should be appreciated that the systems and methods of the present invention are described below with reference to block diagrams and flowchart illustrations of systems, methods, apparatuses and computer program products according to embodiments of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Referring again to FIG. 3, assets representing content and/or services generated by content/service providers 135 are transmitted via a distribution network 140 to a headend 145. The headend 145, in turn, receives the assets, parses the assets and forwards the appropriate content and/or services to select set-top boxes 155 via an HFC Network 150. The assets are transmitted from the content/service providers 135 to the headend 145 via any well-known form of high-bandwidth digital data transmission, such as via MPEG-2 or MPEG-4 transport, as are well known in the art. Upon receiving assets from one or more content/service providers 135, the headend 145 stores the asset in the staging server 160. The staging server 160 of the present invention comprises one or more databases (or memory elements) for storing each asset received from the content/service providers 135. Preferably, the staging server 160 includes a file system directory component that allows access to one or more files stored within the staging server 160. This storage effects the non-real time distribution of assets from the content/service provider 135 to set-top boxes 155. However, it will also be appreciated that where real-time or near real-time forwarding of content from the high speed distribution network to a subscriber set-top box is performed, the storage of assets may be transitory or exist for a very short duration. Once the staging server 160 at the headend 145 receives a new asset from a content/service provider 135, the staging server instructs the Asset Management System (AMS) 165 to create a new package object. The AMS 145 generally includes a processor, operating system, executable code and interfaces through which the AMS 145 can communicate with other elements within the headend 145 and perform the functions described in detail herein.

The staging server 160 also communicates details to the AMS 165 about the asset via a provisioning communication. These details include the location in the staging server's 160 databases of the asset. According to one preferred embodiment of the present invention, the location of the asset in the staging server 160 is identified by a Uniform Resource Locator (URL), although it will be appreciated by those of ordinary skill in the art that other location-defining means may also be used. The AMS 165 associates the location (e.g., URL) of the asset with the created package object corresponding to the asset. Next, according to a preferred embodiment of the present invention, the AMS 165 retrieves the XML file which, as noted above, contains metadata and information about the content associated with the asset.

The XML file contains identification information as to the structure of the asset that arrived at the staging server 160, which is important because the asset structure varies based upon the type of application in the headend 145 for which the asset is intended. Additionally, the XML file associates the metadata with the content. For instance, where content is a movie, the XML file associates metadata identifying the movie title, actors, and the like, with the content file. The AMS 165 does not retrieve the content because the content is usually very large in size, and is not needed to identify the contents, structure and characteristics of the asset because this information is in the XML file retrieved by the AMS 165. For example, where the content associated with an asset is a movie MPEG, the content file may approximately 5 gigabytes in size. After the AMS 165 retrieves the XML file associated with the asset in the staging server 160, the AMS executes a parsing function stored within the AMS 165 to obtain the metadata and the asset's structure. As the AMS 165 parses the XML file, when it locates an asset (or an embedded asset), it allocates an asset component or object in a memory within the AMS 165 and associates the asset with any metadata and content corresponding with that asset. After the asset's contents are distributed, as explained in detail below, the AMS 165 retains a database of the relationship between the higher level asset object and the lower level content objects. Because the parsing of an XML file is well known to those of skill in the art, the parsing function of the AMS 165 is not described in detail herein.

Referring again to FIG. 3, the headend includes at least one application program, and preferably, a plurality of application programs 170, 175. The applications may include a processor, operating system, executable code and interfaces, or alternatively, are software programs operating on a computer as described above and accessible by the AMS 165. The application programs are represented as App. A 170 and App. Z 175 in FIG. 3 to indicate that there may be many application programs that reside in the headend 145. The applications and their functions are known to the content/service providers 135, and serve to interpret the metadata the AMS 165 retrieved and parsed from the staging server 160. Therefore, at least one application identifier is included in the metadata parsed by the AMS 165 to identify the application associated with an asset. According to the preferred embodiment of the present invention, an asset is associated with only one application. This holds true for assets that include embedded assets; therefore, in the illustrative example considered above, where an asset corresponding to a movie includes embedded assets directed to a title, trailer and poster, the asset will correspond to only one application that understands the metadata identifying the additional embedded assets. Because the application associated with an asset is named in the metadata, the AMS 165 can communicate with, or preferably access, the application, which understands the metadata parsed by the AMS 165 and received from the staging server 160. Thereafter, the application instructs the AMS 165 what the AMS 165 should do with the metadata. Examples of applications include an MOD application, an SVOD application, an Electronic Program Guide (EPG) application, and the like, for enabling services provided in the DDDS 130.

It should be appreciated that the content/service providers 135 must know details concerning the applications in creating assets. For instance, the content/service providers 135 must known how the applications identify metadata, including the common structure the metadata should take for a given application (e.g., app. A 170). However, this relationship allows multiple content/service providers to use the application to enable automated and efficient distribution of the content to subscribers. For instance, each MOD asset can leverage the use of an MOD application, regardless of specifics associated with the movie, which allows a common format to be used by multiple content/service providers 135. Additionally, separating the AMS 165 from the applications 170, 175 allows updates to the applications independent of the AMS 165. This is extremely beneficial in cable television systems, which are constantly evolving in the type and quantity of services being offered, because new services will, in a worst case scenario, only require an additional application installed in the headend 145 rather than substantial changes to existing elements such as the AMS 165.

After the requisite application instructs the AMS 165 what to do with the metadata the AMS 165 stores the metadata in one or more servers. This instruction includes an instruction identifying one or more appropriate servers that should receive the asset. Specifically, the application returns to the AMS 165 a list of servers that should receive a particular asset. Each application is programmable by a user associated with the application such that the application can determine, based upon a set of rules provided by the user, on which server an asset should be placed. More particularly, the rules identify the server or servers that should receive an asset given information provided by the metadata, as will be explained in greater detail below.

The servers are located in the headend 145, and are represented as Server A 180 and Server Z 185 in FIG. 3 to indicate that there may be many servers residing in the headend 145. The servers represent a variety of well known server types, such as a VOD server, web server, or a Broadcast File System (BFS) server. The servers each contain a content object interface accessible by the AMS 165, through which the AMS 165 instructs the server to instantiate a new content object. The AMS 165 also identifies the location of the file associated with the content, such as by a URL. The server then makes a request to the staging server 160 for the content, which results in the content flowing from the staging server 160 to the server. According to one preferred embodiment of the present invention, the server request to the staging server 160 for content is an File Transfer Protocol (FTP) request. Where an application instructs the AMS 165 that multiple servers should receive content associated with an asset, each server independently FTPs the staging server 160 for content. Therefore, for instance, three VOD servers requesting the same content (e.g., data representing an MPEG movie) will each execute an FTP request. After the FTP request is received by the staging server, the appropriate content is accessed in the staging server and forwarded to the server for storage or immediate transmission to a subscriber set-top box.

FIG. 4 is a block diagram flow chart showing an illustrative example of the creation and distribution of an asset in the BDBS of FIG. 3, according to one aspect of the present invention. In this example an asset is initially created (block 190) by a content/service provider 135. The asset, according to one illustrative example, may include metadata, and three embedded assets: a title asset, a trailer asset, and a poster asset. Each of these three embedded asset contain associated metadata and content. For instance, the title content may be data comprising the actual movie, the trailer content may be data comprising the trailer, and the poster content may be data comprising a movie poster image. Upon receiving the asset (block 195) at the staging server 160, the staging server notifies (block 200) the AMS 165 that an asset has been received, and provides the AMS 165 the location (block 205) of the asset. Next, the AMS 165 retrieves the asset's XML file (block 210) which contains metadata and information about the content associated with the asset. After parsing the metadata (block 215), the AMS 165 identifies that the asset corresponds to an particular MOD application (block 220) that is identified in the asset's metadata.

Next, the AMS 165 accesses the MOD application (block 225), which instructs the AMS 165 what should be done with the asset based upon rules stored in the MOD application. Specifically, the MOD application instructs the AMS 165 on which server and/or servers the asset's (and embedded asset's) content(s) should be placed (block 230), and hands the AMS a list of servers in the headend to effect this instruction. For instance, if the metadata identifies that the video is in Spanish, the MOD application can instruct the AMS 165 to make the video available on only servers that serve areas with a specified population of Spanish-speaking subscribers. Additionally, because the asset includes a title, trailer and poster embedded assets, the MOD application may instruct the AMS 165 to place the movie and trailer content on a VOD server, and to place the poster (e.g., and image file) on a separate server such as a BFS server, as the VOD server may not be capable of handling an image file, such as JPEG image. According to one aspect of the invention, the MOD application includes a provisioning graphical user interface (GUI) to allows a user associated with the MOD application to generate the rules that identify the servers to receive the various portions of contents within a particular asset. For instance, in the present illustrative example, the GUI may allow a user to specify the servers that each receive title content.

Referring again to FIG. 4, in response to the MOD application's instruction, the AMS 165 instructs each server to retrieve content (block 235) for the MOD application identified as appropriate for that particular server. This retrieval is preferably executed by each server using FTP. Finally, after the asset's contents are distributed, the AMS 165 updates an internal database (block 240) as to the servers that receive the content objects. These content objects are associated in the AMS 165 with the higher level asset object. For instance, in the present example, the AMS will retain that the asset corresponds to 3 pieces of content: the movie, trailer, and poster. Later, when a subscriber requests a movie from the headend 145, the AMS 165 accesses the database to identify the appropriate content that should be played by one or more servers.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A non-transitory computer readable medium which when executed by a processor of an asset management system of a cable service provider causes the processor to perform the steps of:
    parse a first message sent from a staging server of said cable service provider wherein said first message indicates an asset has been received by said staging server, wherein said asset has a structure, said asset comprising a content object comprising digitally encoded video content and a metadata object comprising an application program identifier;
    retrieve said metadata object of said asset from said staging server using a storage location of the asset provided by said staging server;
    determine one of a plurality of application programs identified by said application program identifier of said metadata object, wherein said one of said plurality of application programs is programmed to recognize said structure of said asset;
    parse a second message from said one of a plurality of application programs indicating a storage server configured to store said asset; and
    generate a third message to said storage server indicating said storage location of said asset in said staging server and instructing said storage server to retrieve and store said asset.

2. The non-transitory computer readable medium of claim 1, wherein said digitally encoded video content comprises an MPEG encoded movie.

3. The non-transitory computer readable medium of claim 2, wherein said asset comprises a second asset, wherein said second asset comprises a second content object comprising digitally encoded video content comprising a movie trailer for said movie.

4. The non-transitory computer readable medium of claim 1, wherein the first message from the staging server includes a first URL indicating said storage location of the metadata object.

5. The non-transitory computer readable medium of claim 4, wherein the one of the plurality of application programs identified by said application program identifier is configured to parse the structure of said metadata object.

6. The non-transitory computer readable medium of claim 5 further comprising the step of providing said metadata object to said one of said plurality of application programs.

7. The non-transitory computer readable medium of claim 5 comprising the step of providing said storage location of said metadata object to said one of said plurality of application programs.

8. The non-transitory computer readable medium of claim 1 further comprising the step of generating a fourth message to a second storage server indicating said location of said asset and instructing said second storage server to retrieve and store said asset.

9. The non-transitory computer readable medium of claim 8, wherein said metadata object comprises an XML file identifying a structure of said asset.

10. The computer readable medium of claim 1 further comprising the step of updating a database associating said asset with said storage server.

* * * * *